Patented July 10, 1928.

1,676,581

UNITED STATES PATENT OFFICE.

FRITZ STRAUB AND GUILLAUME DE MONTMOLLIN, OF BASEL, AND MAX SCHMID, OF RIEHEN, NEAR BASEL, SWITZERLAND, ASSIGNORS TO THE FIRM SOCIETY OF CHEMICAL INDUSTRY IN BASLE, OF BASEL, SWITZERLAND.

CHROMIUM COMPOUND OF PYRAZOLONE-AZO-DYESTUFF AND PROCESS OF MAKING SAME.

No Drawing. Application filed December 16, 1927, Serial No. 240,622, and in Switzerland December 24, 1926.

The present invention relates to new chromium compounds of pyrazolone-azo-dyestuffs. It comprises the process of making the new dyestuffs, the new dyestuffs themselves, as well as the material dyed with same.

It has been found that new metal compounds of azo-dyestuffs may be obtained by treating those azo-dyestuffs which are obtained by uniting ortho-hydroxy-diazo compounds with 3-methyl-5-pyrazolone, with agents yielding chromium.

The new dyestuffs, which are to be considered as chromium compounds of the azo-dyestuffs of the general formula:

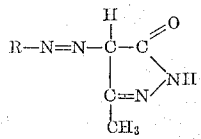

wherein R means an aryl residue which contains in ortho-position to the azo-group an hydroxyl group, form orange to red and brown powders which dissolve in water with orange to red coloration, dyeing wool fast orange to red tints. They are also valuable for the dyeing of lacquers.

*Example.*

41.5 parts of the dyestuffs obtained by coupling the nitrated diazo compound of 1-amino-2-naphthol-4-sulfonic acid with 3-methyl-5-pyrazolone, corresponding very probably with the formula:

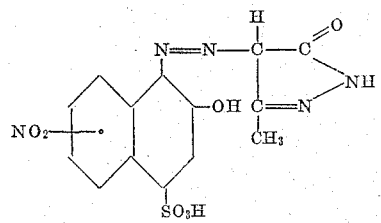

are dissolved in 1100 parts of boiling water. The solution is mixed with 22.8 parts of chromium oxide in the form of an aqueous solution of chromium fluoride and after addition of glass powder the whole is boiled for a long time in a reflux apparatus.

The new chromium compound is thus caused to separate in a finely crystalline form insoluble in water. It is filtered, washed with water and dissolved in 500 parts of a lukewarm solution of caustic soda of 1.2 per cent strength. From this solution the dyestuff, which is now soluble, is obtained by slightly acidifying by means of glacial acetic acid and salting out. When dry it forms a brown powder soluble in water to an orange red solution; it dyes wool, preferably in a sulfuric acid bath, red tints of excellent fastness. It dyes silk also fast red tints.

The corresponding dyestuff from 1:2-naphthalene-diazo-oxide-4-sulfonic acid obtained in a similar manner dyes wool blue-red tints.

Orange dyeing products are obtained by treating with agents yielding chromium, such as chromium fluoride, chromium formate, chromium acetate, freshly precipitated chromium hydroxide, alkali chromite, and the like, the azo-dyestuffs from diazotized ortho-aminophenolsulfonic acid, 4-nitroaminophenol-6-sulfonic acid, 6-nitroaminophenol-4-sulfonic acid, 4-chloroaminophenol-5-sulfonic acid, 4-chloroaminophenol-6-sulfonic acid, ortho-aminophenol, ortho-aminophenol-4-sulphamide, 4- or 5-nitroaminophenol, 4-chloroaminophenol, picramic acid, and the like, and 3-methyl-5-pyrazolone.

What we claim is:—

1. Process for the manufacture of chromium compounds of ortho-hydroxy-azo-dyestuffs, consisting in treating those dyestuffs which are obtained by coupling ortho-hydroxy-diazonium compounds with 3-methyl-5-pyrazolone, with agents yielding chromium.

2. Process for the manufacture of chromium compounds of ortho-hydroxy-azo-dyestuffs, consisting in treating the dyestuff which is obtained by coupling the nitrated diazo-compound of the 1-amino-2-hydroxy-naphthalene-4-sulfonic acid with 3-methyl-5-pyrazolone, with agents yielding chromium.

3. As new products the chromium compounds of the dyestuffs of the general formula:

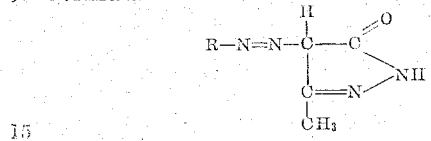

wherein R means an aryl residue which contains in ortho-position to the azo-group an hydroxyl group, which products form orange to red and brown powders which dissolve in water with orange to red coloration, dyeing wool fast orange to red tints.

4. As new products the chromium compounds of the dyestuff of the probable formula:

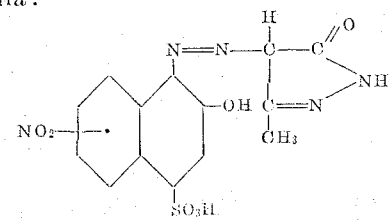

which products form red-brown powders, dissolving in water with red coloration, and dyeing wool fast red tints.

5. The material dyed with the products of claim 3.

6. The material dyed with the products of claim 4.

In witness whereof we have hereunto signed our names this 3rd day of December, 1927.

FRITZ STRAUB.
GUILLAUME DE MONTMOLLIN.
MAX SCHMID.